United States Patent [19]

Ban et al.

[11] Patent Number: 5,301,898
[45] Date of Patent: Apr. 12, 1994

[54] OUTER SPOOL TYPE SPINNING REEL HAVING IMPROVED BAIL ARM CONTROL MECHANISM

[75] Inventors: Masuo Ban; Osamu Yoshikawa, both of Sakai, Japan

[73] Assignee: Shimano, Inc., Osaka, Japan

[21] Appl. No.: 28,599

[22] Filed: Mar. 8, 1993

Related U.S. Application Data

[63] Continuation of Ser. No. 814,057, Dec. 26, 1991, abandoned, which is a continuation of Ser. No. 555,822, Jul. 20, 1990, abandoned, which is a continuation of Ser. No. 825,947, Feb. 3, 1986, abandoned, which is a continuation of Ser. No. 766,677, Aug. 16, 1985, abandoned, which is a continuation of Ser. No. 411,808, Aug. 26, 1982, abandoned, which is a continuation of Ser. No. 217,125, Dec. 17, 1980, abandoned.

[30] Foreign Application Priority Data

Dec. 29, 1979 [JP] Japan ............. 54-184221[U]

[51] Int. Cl.⁵ ............................................. A01K 89/01
[52] U.S. Cl. .................................................. 242/233
[58] Field of Search ................................ 242/231-233

[56] References Cited

U.S. PATENT DOCUMENTS

| | | | |
|---|---|---|---|
| 2,498,987 | 2/1950 | Duncan | 242/84.5 |
| 2,658,697 | 11/1953 | Steinbaugh | 242/84.2 A |
| 2,713,463 | 7/1955 | Sarah | 242/84.4 |
| 2,773,654 | 12/1956 | Hubner | 242/233 |
| 2,863,617 | 12/1958 | Chapin et al. | 242/233 |
| 2,891,738 | 6/1959 | Chapin | 242/84.21 |
| 2,901,193 | 8/1959 | Askins et al. | 242/233 |
| 3,095,158 | 6/1963 | Lonison | 242/233 |
| 3,138,344 | 6/1964 | Small | 242/230 |
| 3,233,845 | 2/1966 | Inamura | |
| 3,342,442 | 9/1967 | Brantingson | 242/233 |
| 3,796,391 | 3/1974 | McMickle | 242/233 |
| 3,797,774 | 3/1974 | Dumbauld | 242/232 |
| 4,095,756 | 6/1978 | Morshita | 242/232 |
| 4,098,473 | 7/1978 | Sazaki | 242/232 |
| 4,108,392 | 8/1978 | Maselet | 242/233 |
| 4,163,528 | 8/1979 | Egasaki et al. | 242/300 |
| 4,193,562 | 3/1980 | Gifford | 242/231 |
| 4,202,508 | 5/1980 | Ishida et al. | 242/231 |
| 4,238,085 | 12/1980 | Jansson et al. | 242/232 |
| 4,256,271 | 3/1981 | Ruin | 242/84.2 G |
| 4,279,387 | 7/1981 | Morimoto | 242/232 |

FOREIGN PATENT DOCUMENTS

| | | | |
|---|---|---|---|
| 855478 | 9/1952 | Fed. Rep. of Germany | 242/233 |
| 994094 | 8/1951 | France | 242/84.2 G |
| 5490494 | 12/1952 | Japan . | |
| 36-6477 | 4/1961 | Japan . | |
| 36-7780 | 4/1961 | Japan . | |
| 39-4826 | 4/1964 | Japan . | |
| 39-34672 | 11/1964 | Japan . | |
| 39-34673 | 11/1964 | Japan . | |
| 49-19186 | 5/1974 | Japan . | |
| 52-26469 | 6/1977 | Japan . | |
| 932596 | 7/1963 | United Kingdom | 242/233 |
| 1119852 | 7/1968 | United Kingdom | 242/232 |

OTHER PUBLICATIONS

Roddy Gyro Advertisements, *Field and Stream*, Mar., Apr. and May, 1964.
Roddy Gyro Advertisements, *Outdoor Life*, Mar. and May, 1964.

Primary Examiner—Daniel P. Stodola
Assistant Examiner—John Q. Nguyen
Attorney, Agent, or Firm—Dickstein, Shapiro & Morin

[57] ABSTRACT

A fishing reel supports at a front wall of a reel body, a spool, a rotary frame which has first and second arms, and a bail arm which is supported between the arms in a manner permitting it to be turned over between a position where the rotary frame rotates to wind a fishing line onto the spool and a position where the line is released. A control means is provided to turn over the bail arm from the line winding to the line releasing position, the control means having a control member positioned in proximity to an arm roller at the bail arm which retains the line at the line winding position, so that when an angler catches by his finger the line retained by the arm roller, he can operate the control member in association with the line catching action.

15 Claims, 5 Drawing Sheets

OUTER SPOOL TYPE SPINNING REEL HAVING IMPROVED BAIL ARM CONTROL MECHANISM

This application is a continuation of application Ser. No. 07/814,057, filed Dec. 26, 1991, which is a continuation of application Ser. No. 07/555,822, filed Jul. 20, 1990, which is a continuation of application Ser. No. 06/825,947, filed Feb. 3, 1986, which is a continuation of application Ser. No. 06/766,677, filed Aug. 16, 1985, which is a continuation of application Ser. No. 06/411,808, filed Aug. 26, 1982, which is a continuation of application Ser. No. 06/217,125, filed Dec. 17, 1980, all now abandoned.

FIELD OF THE INVENTION

This invention relates to a fishing reel which includes a rotary frame cooperating with a bail arm to wind a fishing line onto a spool supported in front of a reel body. More particularly, it relates to a spinning fishing reel which has first and second arms projecting from opposite sides of the rotary frame and extending toward the front of the spool, the first arm pivotally supporting a support, and a bail arm having an arm roller and supported across the support and the second arm in a manner which allows it to be turned over between a position where the line is wound onto the spool and a position where the line is released. With this construction an angler can turn the bail arm over to the line releasing position to permit withdrawal of the line from the spool, or to a line winding position to wind the line onto the spool through rotation of the rotary frame.

BACKGROUND OF THE INVENTION

Generally, during casting of a spinning reel an angler turns the bail arm over in a swinging motion from the line winding to the line releasing position. In doing this he first catches, for example, by his right hand forefinger, the line retained by an arm roller at the bail arm which is in the line winding position. Then, while keeping his forefinger in this position, he uses, for example, his left hand to turn over the bail arm from the line winding to the line releasing position.

This very complicated operation makes turning the bail arm difficult and prevents quick casting.

SUMMARY OF THE INVENTION

This invention has been designed to overcome the two-handed cumbersome casting problem associated with spinning reels of the above-described construction. An object of the invention is to provide a spinning fishing reel which allows an angler to simply and rapidly turn over the bail arm from the line winding to the line releasing position by use of the same finger which he uses to catch the line, in sequence to and almost simultaneously with the line catching action.

The fishing reel of the invention has a reel body which carries in front of its front wall a spool and a rotary frame and which has first and second forwardly extending arms. A bail arm is supported between the arms in a manner enabling it to be turned over between a position where the line is wound onto the spool by the rotary frame and a position where the line is released from the spool. The fishing reel is further provided with a control means for turning over the bail arm from the line winding to the line releasing position, which has a control member positioned in proximity to an arm roller provided at the bail arm which retains the line when the bail arm is in the line winding position, whereby an angler can operate the control member in association with catching the line retained to the arm roller with his finger.

In greater detail, the bail arm is connected with the arm roller for retaining the line and with a support supported swingably to the first arm and is adapted to be turned over from its line winding to its line releasing position by a 180° movement through swinging motion of the support. The control means comprises a control member movable relative to the support and an association means to transmit movement of control member to the support, the control member being provided with a control portion which is positioned in proximity to the arm roller of the bail arm when the latter is in the line winding position, so that an angler can operate the control member to turn over the bail arm in sequence to and almost simultaneously with his action of catching the line retained to the arm roller. Hence, he can turn over the bail arm as part of an in sequence to his line catching operation by use of his finger, thereby permitting a simple and quick casting.

The fishing reel of the invention may further include an automatic bail arm turn-over mechanism such that a handle provided at a reel body which is rotatable to wind a line on the spool automatically turns over the bail arm from the line releasing to the line winding position, for example, upon completion of casting. Automatic turn-over mechanisms can be classified into two types, the so-called kick-out type and the so-called kick-in type. The kick-out type has a projection provided at a mounting leg for the reel body which contacts with the support to turn over the bail arm. The kick-in type has a projection within the reel body and a swingable plate provided at the rotary frame and engageable with the projection, so that the plate engages with the projection and swings to turn the bail arm over. Each of these automatic bail arm turning mechanisms may be used in the invention.

Furthermore, the reel of the invention can incorporate a positioning mechanism capable of keeping the control member in a particular position relative to the arm roller where the line is easily caught by the angler's finger for casting, thus ensuring the angler's ability to always easily grasp the control member.

These and other objects and novel features of the invention will become more apparent from the following detailed description taken together with the accompanying drawings, in which:

DETAILED DESCRIPTION OF THE INVENTION

Figures 1, 2:
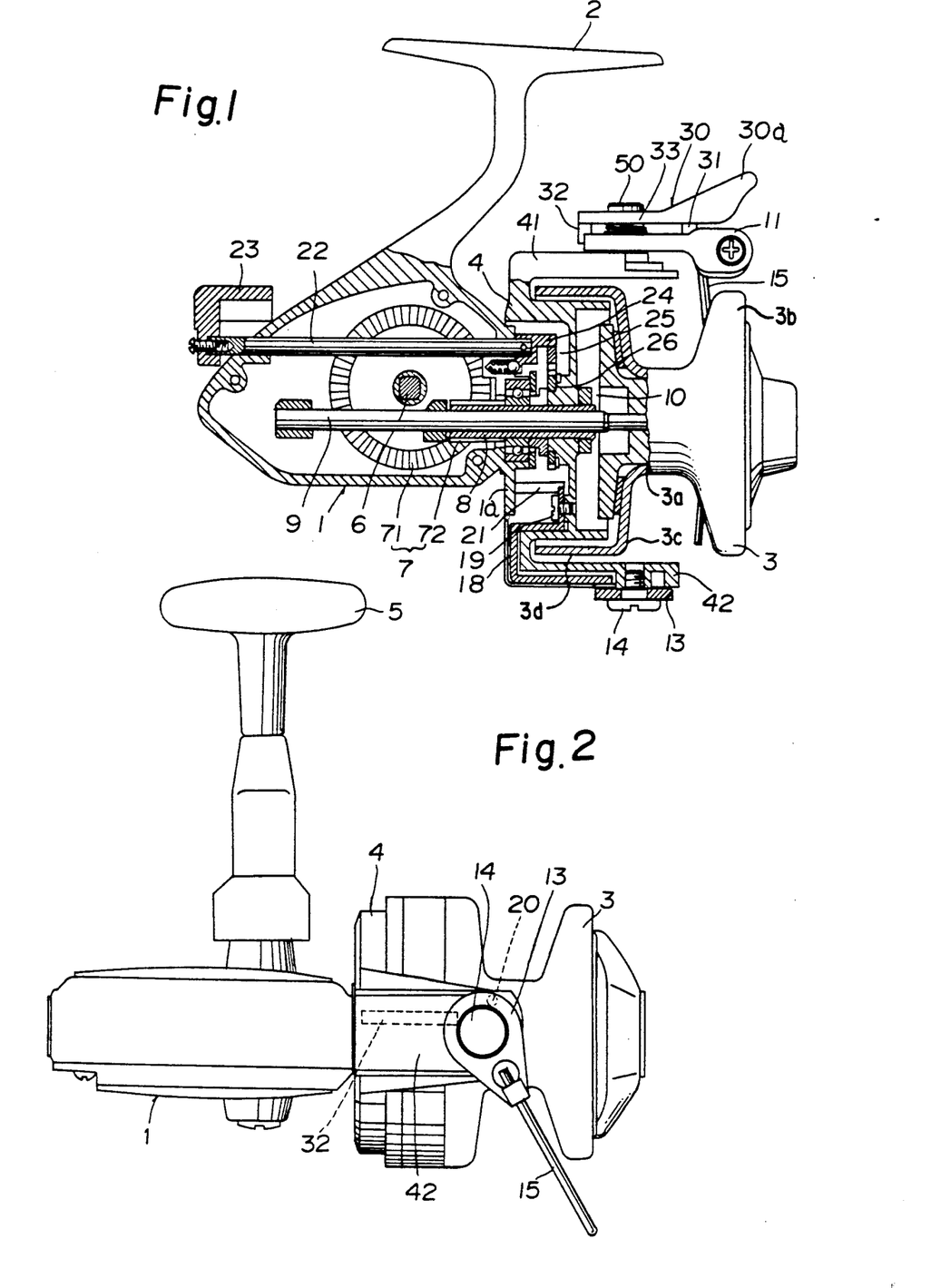
FIG. 1 is a partial longitudinal sectional side view of an embodiment of a fishing reel of the invention.
FIG. 2 is a bottom view of FIG. 1 embodiment.

Referring to FIGS. 1 and 2, an embodiment of a fishing reel adopting the so-called kick-in type of automatic bail arm turning mechanism is shown, which basically comprises a reel body 1 having a mounting leg 2 through which the fishing reel is fixed to a fishing rod, a spool 3 and a rotary frame 4 which are supported in front of a front wall 1a at the reel body 1, a handle shaft 6 having a handle 5 and supported to a side wall 1b at the reel body 1, and a transmitting mechanism 7 for transmitting rotation of the handle shaft 6 to the rotary frame 4.

The handle shaft 6 is supported rotatably to the reel body 1 and extends laterally thereof, and a master gear 71 is fixed to the handle shaft 6. A tublar shaft 8 extending longitudinally of the reel body 1 is supported rotatably to the front wall 1a at the reel body 1, and insertably supports at the center an axially movable spool shaft 9. The tublar shaft 8 and spool shaft 9 project at the axially foremost ends thereof frontward from the front wall 1a, and the spool 3 is mounted on the projecting foremost end of spool shaft 9, while the rotary frame 4 is mounted on the projecting foremost end of tublar shaft 8.

A pinion 72 is provided at the tublar shaft 8 which meshes with the master gear 71 and forms, together therewith, the transmitting mechanism 7.

The rotary frame 4, as shown in FIG. 1, has a cup-like shape, and is disposed between the front wall 1a of body 1 and the spool 3. It is also sleeved at the center onto the tublar shaft 8, and is fixed thereto by a fixing means 10, such as a nut. Rotary frame 4 is provided at the opposite lateral sides with first and second arms 41 and 42 extending frontward of the spool 3.

Figure 4:
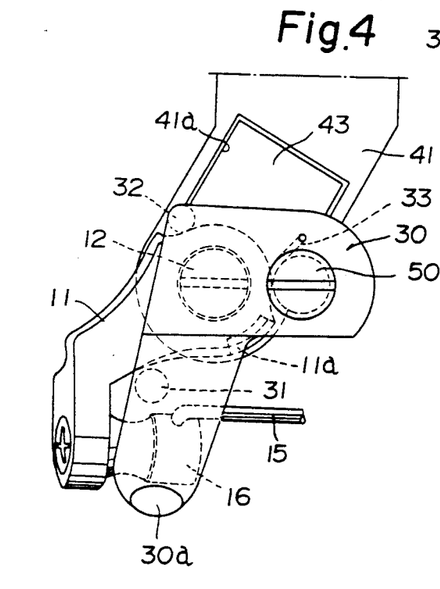
FIG. 4 is an enlarged plan view of the principal portion shown in FIG. 3, FIGS. 5 and 6 are plan views showing operation of the principal portion shown in FIG. 3.
Figure 7:
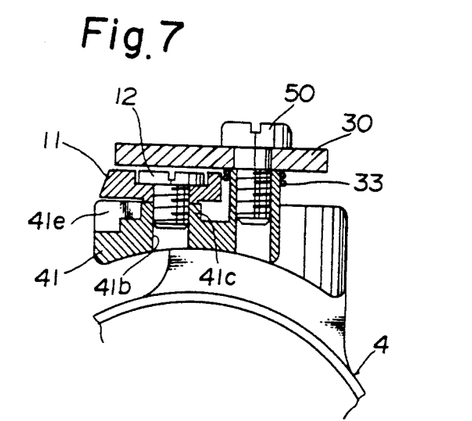
FIG. 7 is a longitudinal front view of the principal portion shown in FIG. 3.
Figure 8:
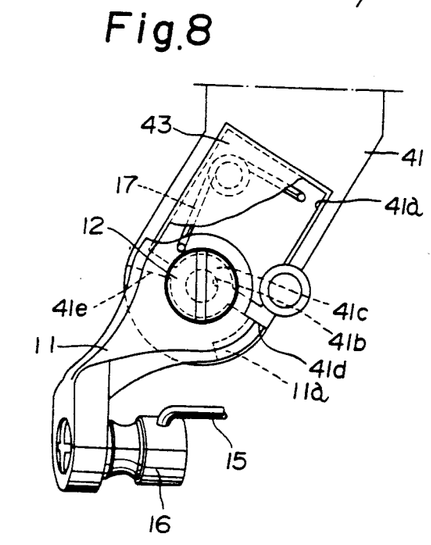
FIG. 8 is a plan view of the principal portion shown in FIG. 3, from which a control member is removed.

The first arm 41, as shown in FIG. 4, is slated at the foremost end laterally with respect to the axis of rotation of rotary frame 4, and has, at an intermediate portion, a spring chamber 41a covered with a lid 43. The arm 41 has at its front end a boss 41c having a threaded bore 41b as shown in FIG. 7, and control surfaces 41d and 41e disposed at both sides of boss 41c in a manner of sandwiching the boss 41c as shown in FIG. 8. The control surfaces 41d and 41e control the end points of the line winding and line releasing positions of a bail arm as described further below. A support 11 is pivoted swingably to the boss 41c through a mounting bolt 12 which is screwed with the threaded bore 41b. A holder 13, as shown in FIG. 2, is pivoted swingably to the second arm 42 through a mounting bolt 14. A bail arm 15 having an arm roller 16 is mounted across support 11 and holder 13.

A torsion spring 17, as shown in FIG. 8, is housed within the spring chamber 41a at the first arm 41, and is retained at one end to the support 11 and at the other end to the first arm 41, so that the bail arm 15 is biased by the spring 17 selectively to either the line winding or line releasing position.

Figure 3:
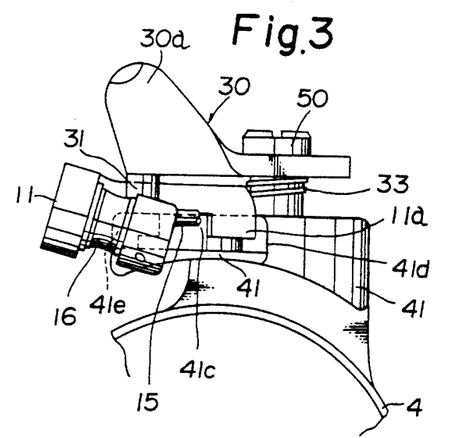
FIG. 3 is an enlarged, front view of a principal portion of the FIG. 1 embodiment.

A stopper 11a, as shown in FIG. 3, is provided at the rear of support 11 and abuts against the control faces 41d or 41e, thereby limiting movement of the bail arm 15 to define the end points of the line windup and line releasing positions.

The first arm 41 is slanted for the purpose of shifting the pivotal position of support 11 from the axis of rotation of rotary frame 4, thereby eliminating unbalanced rotation of rotary frame 4, which is caused by attachment to the first arm 41 of a control member 30 for turning over the bail arm 15 as hereinafter described, but such shifting is not always necessary. In the drawing, the first arm 41 is slanted at an angle of 30° and the shift is 3 mm.

Next, a bail arm turn-over mechanism of the kick-in type applied to the above fishing reel will be described.

The bail arm turn-over mechanism is similar to the well known kick-in type mechanism, and functions to automatically turn over the bail arm 15 from a line releasing to a line winding position. In the turn-over mechanism used in the invention the rotary frame 4, as shown in FIG. 1, incorporates a lever 18 which is bent at an intermediate portion thereof. The lever 18 is pivoted to the rotary frame 4 through a bolt 19 and extends at one end inside the second arm 42. The extending end of lever 18, as shown in FIG. 2, is positioned on the path of a pin 20 projecting from the lower surface of holder 13. In other words, the pin 20 is allowed to abut against the extending end of lever 18 when the holder 13 swings. A projection 21 is formed at the front wall of reel body 1 which abuts against the inner end of lever 18, so that lever 18 abuts at its inner end against the projection 21 when the rotary frame 4 rotates. Hence, the lever 18 swings to allow the holder 13 to swing through its abutment against the pin 20 at the extending end of lever 18, thereby automatically turning the bail arm 15 over to the line winding position from the line releasing position.

A control shaft 22 extends in parallel to the spool shaft 9 and is supported rotatably to the reel body 1, projecting at both ends outwardly from the front and rear walls of reel body 1 respectively. An operating knob 23 is provided at the projecting rear end of the control shaft 22, and an actuator 24 at the projecting front end. A pawl 25 actuated by the actuator 24 is pivoted swingably to the front wall 1a of reel body 1 and an anti-reverse rotation gear 26 engageable with the pawl 25 is fitted into a cylindrical trunk of rotary frame 4, so that the pawl 25 engages with the gear 26 to thereby prevent the rotary frame 4 from reversely rotating.

The control means which permits an angler to turn over the bail arm 15 from its line winding to its line releasing position comprises a control member 30 which is movable relative to the support 11 and an association means for transmitting movement of control member 30 to the support 11. The control member 30 has a control portion 30a which is positioned in proximity to an arm roller 16 at the bail arm 15 when the latter is put in the line winding position, so that when the angler uses his finger to catch the line retained to the arm roller 16, he can operate the control member 30 in sequence to his line catching action.

Figure 9:
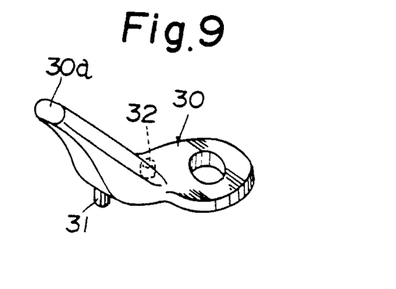
FIG. 9 is a perspective view of the control member.

The control means, when used with the reel shown in FIGS. 1 and 2, has the control member 30, as shown in FIGS. 3, 4 and 7, pivoted to the first arm 41 at the position displaced with respect to the pivotal portion of support 11, through a mounting bolt 50 parallel to the mounting bolt 12, so that the control portion 30a swings longitudinally of the reel body 1 around the mounting bolt 50. Also, the control portion 30a, as shown in FIGS. 4 and 9, is displaced with respect to the pivotal portion of control member 30 and bends upwardly toward the foremost end which is formed in a hemispheric shape.

Referring to FIG. 4, the control portion 30a is disposed outwardly from the arm roller 16 and overlaps therewith when viewed vertically, thereby being operable in sequence to the angler's line catching action. Thus, the control member 30 is operated to swing the support to thereby turn over the bail arm 15.

In the fishing reel shown in FIGS. 1 and 2, the association means, as shown in FIGS. 3 and 4, comprises a projection 31 provided at the lower surface of control member 30 which abuts against the front surface of support 11. Alternatively, the projection 31 may project from the support 11 or from both the control member 30 and support 11.

As further shown in FIGS. 1 and 2, a projection 32 is provided at the lower surface of control member 30 which abuts against the rear side of support 11, and a spring 33 is interposed between the control member 30 and the first arm 41 for biasing the projection 32 to abut against the rear side of support 11. As a result, the control portion 30a at control member 30 is always positioned in close proximity to the arm roller 16 when the bail arm 15 is in the line winding position. As an alternative arrangement, the projection 32 may project from the support 11 or from both the control member 30 and support 11.

Next, the operation of the fishing reel constructed as just described, will be described in detail.

At first, the bail arm 15 is in its line winding position and an angler places the usual sinker and rig at the end of the fishing line. He then catches by his forefinger the line retained by the arm roller 16 at the bail arm 15, at which time he puts his line catching forefinger onto the control portion 30a of control member 30 and pushes it rearwardly.

Figure 5:
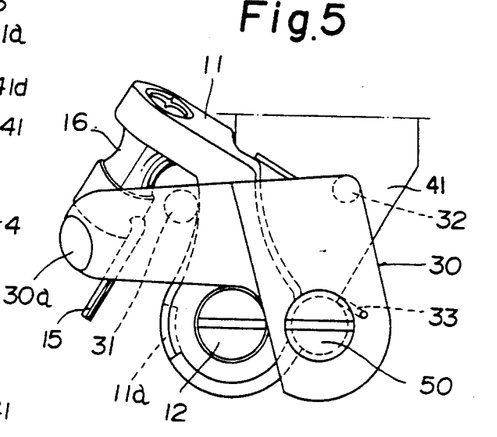

Consequently, the control member 30 swings around the mounting bolt 50, and the projection 31 at the control member 30 abuts against the front surface of support 11 to swing the support 11, whereby the bail arm 15 biased in its line winding position by the torsion spring 17, is turned over to the line releasing position as shown in FIG. 5.

Thus, the angler can, by use of the forefinger of his hand which is gripping the rod, push the control member 30 in sequence to and almost simultaneously with catching the line, thereby turning over the bail arm 15 in a serial action of the forefinger, resulting in an easy and quick casting.

In the above described embodiment, the pivotal position of control member 30 relative to the first arm 41 is displaced from the pivotal position of the support 11, and a distance between the projection 31 at the control member 30 and the pivotal position of control member 30 is made larger than that between the pivotal position of support 11 and the projection 31 abutting thereagainst. Hence, the angle of swinging motion of the projection 31, even though smaller than that of the support 11, allows the support 11 to swing to a larger extent, producing a swinging of the support through a given angle to thereby turn over the bail arm 15.

After casting, handle 5 can be operated to rotate the rotary frame 4 to wind the line, thereby enabling the bail arm 15 to be turned over again to the line winding position. In other words, the rotary frame 4 rotates to allow the lever 18 to abut against the projection 21 so that the bail arm 15 is automatically turned over as is well-known.

Figure 6:
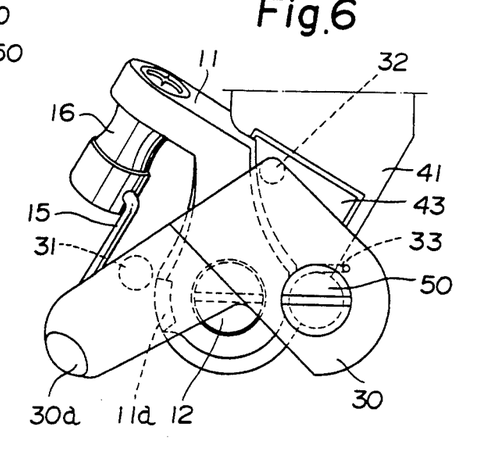

After the bail arm 15 is turned to its line releasing position, the angler releases his forefinger from the control member 30 whereby, as shown in FIG. 6, it swings forward through the biasing of spring 33. Hence, the control member 30, when the bail arm 15 is turned over to the line winding position, does not contact with the angler's hand gripping the fishing rod, and, when the bail arm 15 is in the winding position, is retained in a position overlapping the arm roller 16.

Figure 10:
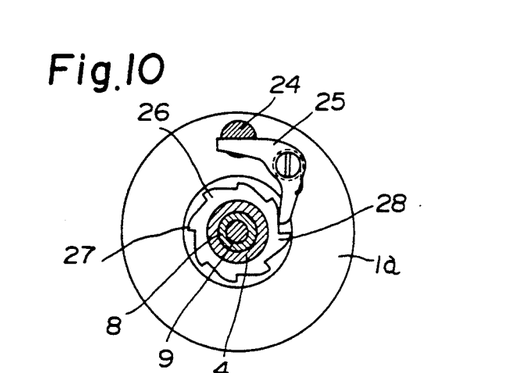
FIGS. 10 through 12 are views explanatory of a principal portion of an embodiment of a positioning mechanism in an operating condition.
Figure 11:
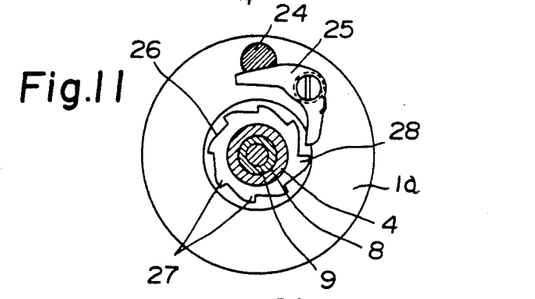
Figure 12:
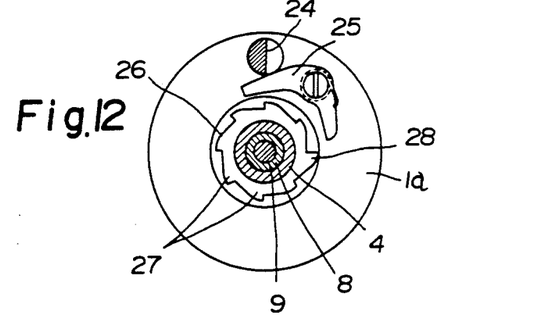

The fishing reel may include a positioning mechanism by which the rotary frame 4 ceases its rotation when the arm roller 16 and control member 30 are suitably positioned for the line catching action and operation of the control member 30 by the angler, thereby enabling a quick casting. An embodiment of the positioning mechanism is illustrated in FIGS. 10 through 12.

The positioning mechanism has one tooth 28 of a plurality of teeth 27 provided at the outer periphery of anti-reverse rotation gear 26 in engagement with the pawl 25 when the arm roller 16 and control member 30 are in an optimum position for the line catching operation by the angler. Tooth 28 projects radially outwardly from the other teeth 27. The actuator 24 extending from a bore in front wall 1a is rotatable in three steps to respective positions where: (1) the pawl 25 disengages from the teeth 27 and 28 of the anti-reverse rotation gear 26 as shown in FIG. 12, (2) the pawl 25 engages only with the projecting tooth 28, as shown in FIG. 11, and (3) the pawl 25 engages with the respective teeth 27 and 28 as shown in FIG. 10.

Actuator 24 is rotated by rotation of control shaft 22 through the knob 23 to set the actuator 24 to one of the three positions. In the position where the pawl 25 engages only with the one projecting tooth 28, the angler may release his hand from the handle 5 on the handle shaft 6 to allow the rotary frame 4 to reversely rotate to the noted optimum position for the angler's hand. The pawl 25 then engages with the tooth 28 to stop the reverse rotation of rotary frame 4.

With the positioning mechanism the rotary frame 4 ceases its rotation at the position where the arm roller 16 and control member 30 are nearest the fishing rod. In other words, the angler, when casting, operates the knob 23 to set the actuator 24 to engage only with the tooth 28, whereby the arm roller 16 and control member 30 always stop at the optimum position where he can most easily catch the line and operate the control member 30. Hence, he can, immediately after operating knob 23, catch the line and simultaneously operate the control member 30 to turn over the bail arm 15, thus permitting an easier casting.

In the above construction, a tooth of the anti-reverse rotation gear 26 teeth is used for preventing the reverse rotation of rotary frame 4 to position the rotary frame 4. Alternatively, a locking gear separate from the gear 26 may be provided, which has single tooth. In this instance, a pawl separate from the pawl 25 is provided for engagement therewith.

Figure 13:
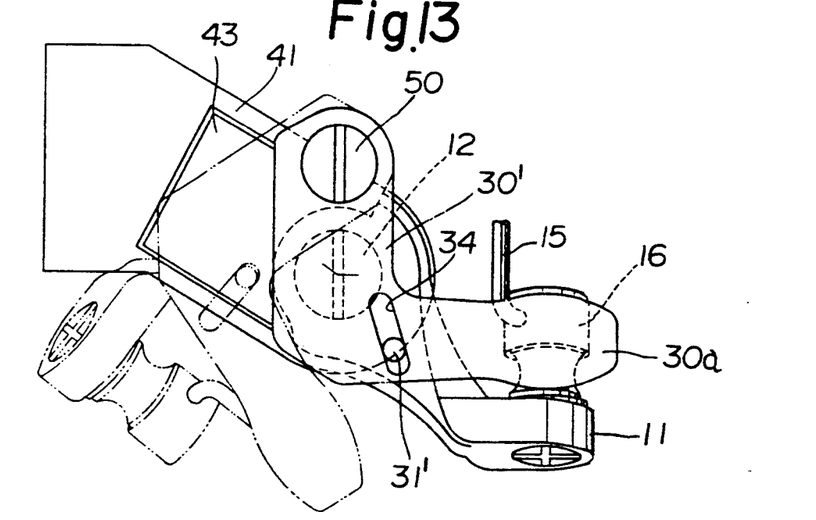
FIG. 13 is an enlarged plan view corresponding to FIG. 4, showing a principal portion of a modified embodiment of the fishing reel of the invention.

In a modification of the above described fishing reel, the association means for the support 11 which is associated with the control member 30' may be formed as an elongate slot 34 at the control member 30' as shown in FIG. 13 with the projection 31' of support 11 being inserted into the slot 34, such that the support 11 is swung in association with movement of the control member 30'. In this construction, the slot 34 may be provided at the support 11 and the projection 31' at the control member 30'.

Figure 14:
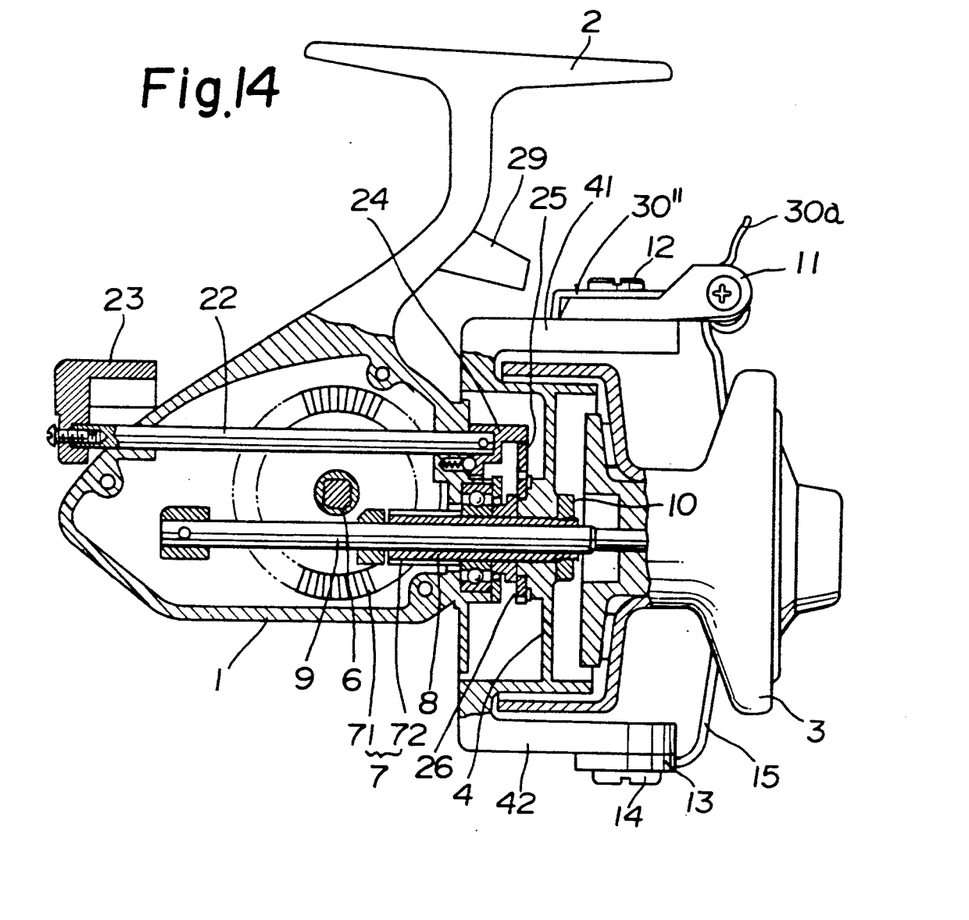
FIG. 14 is a partial longitudinal sectional view of another modified embodiment.
Figure 15:
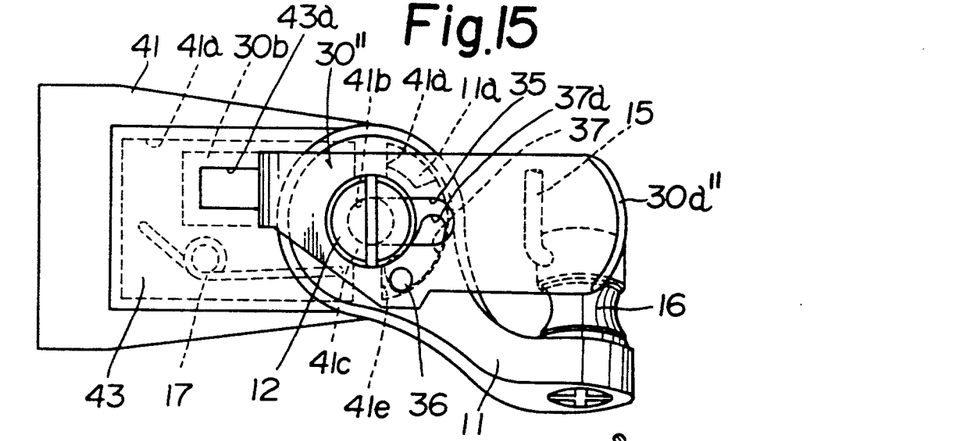
FIG. 15 is an enlarged plan view of a principal portion of the FIG. 14 embodiment.
Figure 16:
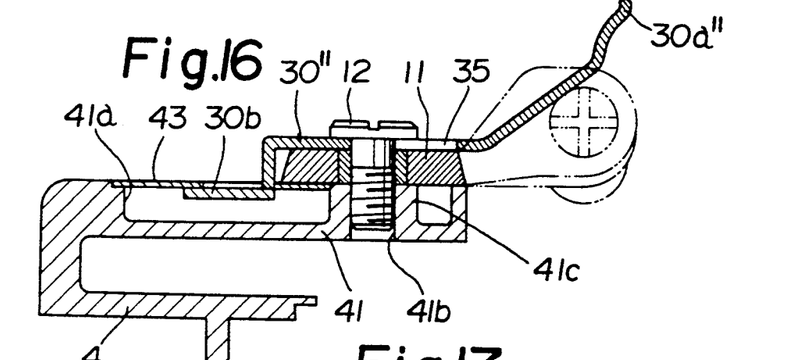
FIG. 16 is a longitudinally sectional view of the principal portion shown in FIG. 15.
Figure 17:
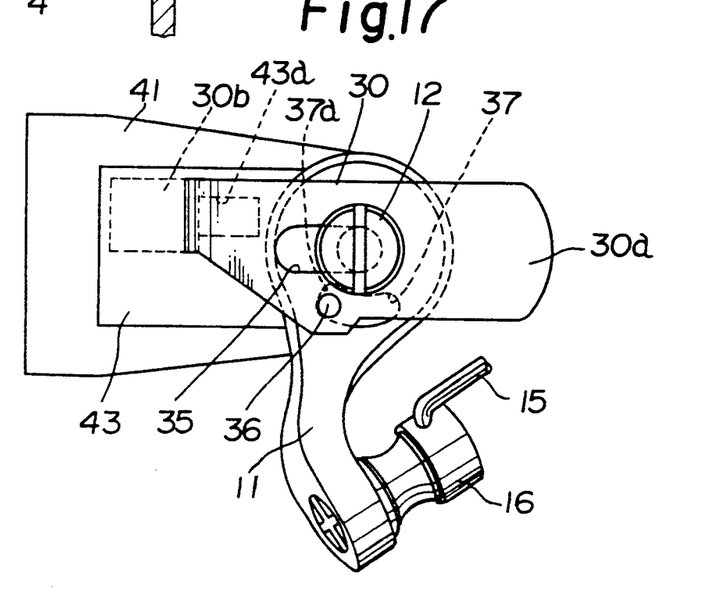
FIG. 17 is a plan view showing the principal portion shown in FIG. 15, in an operating condition.

In another modified arrangement, the control member 30", as shown in FIGS. 14 through 16, may be supported to the first arm 41 in a relation of being slidable longitudinally of the arm 41. As shown in FIGS. 14 through 16, control member 30" is formed of a metallic plate strip which is bent at one end upwardly and has at the utmost end a control portion 30a". The control member 30" is also bent at the other end downwardly to have at the lower end a guide plate 30b, and has at an intermediate portion a longitudinally extending elongate slot 35. In this construction, the control member 30" overlaps the support 11, and a mounting bolt 12 for supporting the support 11 is inserted into the slot 35, thereby being supported slidably to the first arm 41. The guide plate 30b, as shown in FIG. 16, is inserted into the spring chamber 41a through a window 43a formed at the lid 43 covering the spring chamber 41a, thereby guiding the control member 30" so it is slidable longitudinally of the reel body 1.

The association means, through which the support 11 is associated with the control member 30", as shown in FIGS. 14 through 16, comprises a pin 36 provided at the control member 30" and directed toward the support 11 and a recess 37 of a circular arc which is provided at the support 11 to receive the pin 36, so that when the control member 30" slides rearwardly of the reel body 1, the pin 36 abuts against one end surface 37a of recess 37, thereby swinging the support 11 rearwardly of the reel body 1.

As an alternative to the torsion spring 17 described in the above embodiments a unidirectionally biasing coil spring may be used instead. In this case, the coil spring is wound onto the mounting bolt 12 supporting the support 11 to the first arm 41, and is retained at one end to the support 11 and at the other end to the first arm 41, thereby biasing the support 11, and in turn, the bail arm 15, toward the line winding position. A retaining mechanism is provided at the second arm 42 side which retains the bail arm 15 when in the line releasing position. The retaining mechanism is well-known per se such that a detailed description thereof is unnecessary.

As noted, the embodiment shown in FIGS. 1 and 2 employs the kick-in type mechanism for automatically turning over the bail arm 15 by the rotation of handle 5. Alternatively, a kickout type mechanism, as shown in FIG. 14, may be applied to the invention, which comprises a projection 29 provided at the mounting leg 2 at the reel body 1 and a cam provided at the support 11, the projection 29 engaging with the cam to thereby turn over the bail arm 15.

As is evident from the above description, the fishing reel of the invention enables an angler, when casting, to catch by his forefinger the line extending toward the tip of the fishing rod from the spool through the arm roller, and to almost simultaneously operate the control member in a serial action of the forefinger to swing the support to turn the bail arm in swinging motion from the line winding to the line releasing position. Hence, the bail arm is not operated independently of the line catching action, thereby permitting simple and rapid casting.

Although many different embodiments have been described, they are merely exemplary of the invention as many variants thereof may be constructed without departing from the spirit and scope of the invention. Accordingly, the invention is not limited by the foregoing description, but only as defined by the attached claims.

What is claimed is:

1. A fishing reel, comprising:
   a reel body having a leg for mounting said body to a fishing rod;
   a spool supported in front of a front wall of said reel body;
   a rotary frame disposed between said front wall of said reel body and said spool and supported rotatably to said reel body, said rotary frame having opposite lateral sides and first and second arms extending from said opposite lateral sides of said frame toward the front side of said spool;
   a handle supported to said reel body;
   a transmission mechanism for transmitting rotation of said handle to said rotary frame;
   a bail arm supported to said first and second arms of said rotary frame, said bail arm having an arm roller and a support, said support being supported swingably to the first arm, said bail arm being turnable between a position allowing a fishing line to be wound onto said spool and a position releasing said fishing line;
   control means supported by the first arm of said rotary frame for turning over said bail arm from the line winding position to the line releasing position, said control means comprising a control member movable relative to said support and means associated with said control means for transmitting movement of said control member to movement of said support, said control member having an operation member positioned in proximity to said arm roller when said bail arm is in the line winding position, said control member being swingably supported to said first arm through a pivot which is different from and parallel to another pivot through which said support is supported swingably to the first arm, said associated means comprising a projection provided on one of said control member and support and contacting with the other of said control member and support to cause said support to swing in association with operation of said control member, so that when the line carried by said arm roller is caught by an angler's finger, said control member may be operated in sequence to said line catching action, said first arm being slanted at its foremost end laterally to form an angle with respect to the axis of rotation of said rotary frame to thereby shift the pivotal position of said support with respect to said axis and reduce unbalanced rotation of said rotary frame; and
   a turn-over mechanism for turning over said bail arm from the line releasing position to the line winding position, said turn-over mechanism being provided between said rotary frame and said reel body, so that said handle may be operated to rotate said rotary frame to thereby actuate said turn-over mechanism and turn over said bail arm.

2. A fishing reel according to claim 1, wherein said rotary frame has an anti-reverse rotation gear having a number of teeth, said gear being provided with one tooth projecting radially outwardly from the remainder of said teeth, and said reel body is provided at the front wall thereof with a pawl engageable with each of the teeth of said anti-reverse rotation gear and with a control shaft for moving said pawl to a first position where said pawl engages anyone of said teeth of said anti-reverse rotation gear, to a second position where said pawl disengages from any of said teeth, and to a third position where said pawl engages with said one projecting tooth only, said pawl and projecting tooth forming a positioning mechanism for positioning said arm roller and control member so that engagement of said pawl with said projecting tooth allows said rotary frame to stop its rotation at a predetermining position where said arm roller and control member allow said fishing line to be caught by an angler.

3. A fishing reel according to claim 1, wherein said control member has said projection which contacts with a front surface of said support, to swing said support upon movement of said control member.

4. A fishing reel according to claim 1, wherein said support has a projection in contact with the front surface of said control member in the swinging direction thereof, the front surface of said control member contacting with said projection to swing said support upon movement of said control member.

5. A fishing reel according to claim 1, wherein said control member and support have projections which contact with each other, so that said control member is moved to allow said projections to contact with each other to swing said support upon movement of said control member.

6. A fishing reel according to claim 1, wherein said rotary frame has a locking gear having one tooth, and said reel body being provided at the front wall thereof with a pawl engageable with the tooth of said locking gear, said locking gear and pawl forming a positioning mechanism for said arm roller and control member, so that said rotary frame, arm roller, and control member stop at a predetermined position where said fishing line may be caught by an angler.

7. The fishing reel as in claim 6, further comprising stopper means, disposed on said support and abutting against a control face of said first arm of said rotary frame, for stopping movement of said bail arm at limit positions defined by said line-winding position and said line-releasing position.

8. The fishing reel as in claim 7, wherein said predetermined position is a predetermined angular position of said rotary frame, arm roller, and control member.

9. The fishing reel as in claim 1, further comprising stopper means, disposed on said support and abutting against a control face of said first arm of said rotary frame, for stopping movement of said bail arm at limit positions defined by said line-winding position and said line-releasing position.

10. An outer spool type spinning reel, comprising:
a reel body;
a spool supported adjacent to said reel body, said spool comprising a trunk and first and second flanges, said first flange being located in front of said second flange, said second flange having a skirt portion;
a rotary frame supported rotatably to said reel body, wherein said frame is at least partially surrounded by said skirt portion of said spool, and wherein said frame has first and second arms, said first and second arms being located radially outwardly from said spool;
a handle supported to said reel body;
a transmission mechanism for transmitting rotation of said handle to said rotary frame;
a bail means pivotably supported on said arms, said bail means being pivotable between a line-winding position for winding fishing line onto said spool and a line-releasing position for releasing said fishing line from said spool, said bail means including a line guiding roller which engages said fishing line to wind said fishing line onto said spool in a line-winding direction when said bail means is in said line-winding position; said line guiding roller being arranged relative to said frame such that moving said frame to a predetermined position after winding said fishing line onto said spool causes said fishing line to be in position to be caught by an angler's finger making a line-catching motion, said line-catching motion being a single continuous motion of said finger from an outstretched position to a retracted position, with said fishing line being caught by said finger when said finger is at said retracted position;
a trigger means mounted on said rotary frame for pivoting said bail means relative to said rotary frame from said line-winding position to said line-releasing position, said trigger means being positioned radially outside of said line guiding roller and facing thereto, said trigger means including an operating portion which is engaged by said finger making said line-catching motion, said operating portion being located radially outwardly of said line guiding roller, said operating portion being located in front of said reel body, said operating portion of said trigger means being arranged relative to said frame such that moving said frame to said predetermined position after winding said fishing line onto said spool causes said trigger means to be in position to be operated by said finger making said line-catching motion, and wherein said trigger means is arranged such that operation of said trigger means by said finger making said line-catching motion causes said frame to be biased in a line-unwinding direction, said line-unwinding direction being opposite to said line-winding direction, and wherein said operating portion of said trigger means is arranged relative to said frame such that said finger making said line-catching motion moves generally in said line-winding direction from said outstretched position to said retracted position; and
a positioning means for stopping said frame at said predetermined position and for preventing said rotary frame from rotating in said line-unwinding direction, said positioning means being responsive to rotation of said rotary frame by said transmission mechanism, wherein said positioning means comprises (i) a locking gear having at least one tooth and (ii) a pawl for engaging said tooth of said locking gear when said trigger means is located at said predetermined position;
whereby, after said frame is stopped at said predetermined position by said positioning means, said finger making said single continuous line-catching motion catches said fishing line and almost simultaneously operates said trigger means to pivot said bail means from said line-winding position to said line-releasing position, with said frame being positively maintained at said predetermined position by said positioning means and said finger during the operation of said trigger means.

11. The spinning reel of claim 10, further comprising stopper means for stopping movement of said bail means at limit positions defined by said line-winding position and said line-releasing position.

12. The spinning reel of claim 10, wherein said positioning means includes means responsive to reverse rotation of said rotary frame by said transmission mechanism to position said trigger means at said predetermined position.

13. The spinning reel of claim 10, wherein said bail means further includes a bail arm, said line guiding roller being rotatable with respect to said bail arm, and wherein said line guiding roller is pivotably connected to said first arm of said rotary frame, said bail arm having first and second ends, said first end of said bail arm being adjacent to said line guiding roller, said second end of said bail arm being pivotably connected to said second arm of said rotary frame.

14. The spinning reel of claim 13, wherein said trigger means includes an L-shaped control member (30), said control member having first and second ends, said first end of said control member being pivotably connected (50) to said first arm (41) of said rotary frame, said second end of said control member including said operating portion (30a).

15. The spinning reel of claim 10, wherein said frame includes a generally cylindrical outer wall and connecting portions for integrally connecting said arms to said outer wall of said frame, said skirt portion of said spool having a generally circular rear edge, said rear edge being adjacent to said connecting portions.

* * * * *